United States Patent
Chen et al.

(10) Patent No.: US 10,102,883 B2
(45) Date of Patent: Oct. 16, 2018

(54) HARD DRIVE CARRIER WITH REDUCED AIRFLOW-INDUCED VIBRATIONS

(71) Applicant: QUANTA COMPUTER INC., Taoyuan (TW)

(72) Inventors: Chao-Jung Chen, Taoyuan (TW); Ming-Sheng Chang, Taoyuan (TW); Chih-Hui Hsu, Taoyuan (TW); Yu-Ju Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/408,192

(22) Filed: Jan. 17, 2017

(65) Prior Publication Data
US 2018/0096709 A1    Apr. 5, 2018

Related U.S. Application Data (60) Provisional application No. 62/402,355, filed on Sep. 30, 2016.

(51) Int. Cl.
*G06F 1/18* (2006.01)
*G11B 33/08* (2006.01)
(Continued)

(52) U.S. Cl.
CPC .............. *G11B 33/08* (2013.01); *G06F 1/187* (2013.01); *G11B 33/027* (2013.01);
(Continued)

(58) Field of Classification Search
CPC ..... G11B 33/08; G11B 33/027; G11B 33/124; G11B 33/128; G11B 33/142; G06F 1/187
See application file for complete search history.

(56) References Cited

U.S. PATENT DOCUMENTS 5,694,290 A * 12/1997 Chang ................. G11B 33/025
                                                       361/679.31
6,147,834 A * 11/2000 Srikrishna ............ G11B 33/142
                                                       360/99.18
(Continued)

FOREIGN PATENT DOCUMENTS

CN          102598136 A    7/2012
CN          105519247 A    4/2016
(Continued)

OTHER PUBLICATIONS

Taiwanese Office Action for Application No. 106112231, dated Feb. 8, 2018, w/ First Office Action Summary.
(Continued)

*Primary Examiner* — Hoa C Nguyen
*Assistant Examiner* — Keith Depew
(74) *Attorney, Agent, or Firm* — Nixon Peabody LLP; Eduardo J. Quiñones (57) ABSTRACT

A hard drive disk carrier for reducing airflow-induced vibration of a hard disk drive includes a bracket assembly configured to removably secure the hard disk drive to a receiving component within an enclosure. The bracket assembly is configured for substantially exposing major surfaces of the hard drive to yield exposed surfaces and for mounting within the enclosure so that a first end of the hard disk drive faces the first end of the enclosure and a second end of the hard disk drive faces the second end of the enclosure. The bracket assembly also includes at least one end member associated with the second end of the hard disk drive. The carrier also includes an airfoil assembly with one or more louvers configured to extend from at least the second end of the hard disk drive and partially cover at least one of the exposed surfaces.

10 Claims, 7 Drawing Sheets

(51) Int. Cl.
   *G11B 33/02* (2006.01)
   *G11B 33/12* (2006.01)
   *G11B 33/14* (2006.01)

(52) U.S. Cl.
   CPC .......... *G11B 33/124* (2013.01); *G11B 33/128* (2013.01); *G11B 33/142* (2013.01)

(56) References Cited

U.S. PATENT DOCUMENTS

| | | | | |
|---|---|---|---|---|
| 6,193,339 | B1* | 2/2001 | Behl | G11B 33/02 312/223.2 |
| 6,319,116 | B1* | 11/2001 | Behl | G11B 33/02 361/753 |
| 6,473,297 | B1* | 10/2002 | Behl | G06F 1/184 361/679.33 |
| 2002/0141153 | A1* | 10/2002 | Su | G06F 1/184 361/679.46 |
| 2005/0013110 | A1* | 1/2005 | Shah | G11B 33/08 361/679.36 |
| 2005/0264995 | A1* | 12/2005 | Hanson | G06F 1/20 361/695 |
| 2007/0109984 | A1 | 5/2007 | Buchholz et al. | |
| 2008/0205004 | A1* | 8/2008 | Ueno | G11B 33/142 361/701 |
| 2008/0265125 | A1* | 10/2008 | Ye | G06F 1/187 248/672 |
| 2015/0036284 | A1 | 2/2015 | Ross et al. | |
| 2015/0072606 | A1* | 3/2015 | Mundt | G06F 1/20 454/184 |
| 2015/0109726 | A1 | 4/2015 | Li | |
| 2016/0293223 | A1* | 10/2016 | Ehlen | G06F 1/187 |
| 2017/0269644 | A1* | 9/2017 | Kwon | G06F 1/187 |
| 2017/0301375 | A1* | 10/2017 | Mayhall | G11B 33/1426 |

FOREIGN PATENT DOCUMENTS

TW 200934540 A 8/2009
TW 201517030 A 5/2015

OTHER PUBLICATIONS

Taiwanese Search Report for Application No. 106112231 (report conducted Feb. 5, 2018) mailed with First Office Action dated Feb. 8, 2018.

\* cited by examiner

HARD DRIVE CARRIER WITH REDUCED AIRFLOW-INDUCED VIBRATIONS

CROSS-REFERENCE TO RELATED APPLICATIONS

This application claims priority to and the benefit of U.S. Provisional Patent Application No. 62/402,355, entitled "HARD DISK PROTECT MECHANISM" and filed Sep. 30, 2016, the contents of which are hereby incorporated by reference in their entirety.

FIELD OF THE INVENTION

This invention relates in general to removable hard disk drives and in particular to a vibration dampening system for removable hard disk drive carriers.

BACKGROUND

"Hot-pluggable" hard disk drives (HDD) are removable during operation in a computer or peripheral systems environment. A HDD is typically mounted in a hard disk drive carrier prior to installation in a system. A HDD carrier is a frame-like structure which attaches to the HDD to assist in its insertion into or removal from the system. HDD carriers also protect the HDD when it is outside of the systems environment. HDD carriers are typically constructed out of metal and/or polymeric materials.

A computing system may contain several HDD's, each of which may be readily interchangeable in the system. The HDD's are mounted in a HDD bay or chassis located within a system enclosure. During operation, the HDD's may vibrate, and the vibration can become excessive, particularly when adjacent HDD's are operated simultaneously. Moreover, as HDD technology progresses to faster rotational speeds and cost-reduction architectures, the vibration problems are exacerbated.

Excessive vibration may lead to decreased HDD performance such as recoverable and non-recoverable write inhibits, increased seek times, and increased read and write access times. Excessive vibration may also cause premature HDD failures that are not repairable. Examples include mechanically-damaged platters and read/write heads, mechanical wear on moving HDD components, and data error defects that cannot be corrected through the use of software tools.

Existing technologies have primarily focused on dampening vibration due to the HDD itself, such as the vibrations created by the mechanical components of the HDD. However, other factors contributing to excessive vibration of HDDs have not been carefully studied.

SUMMARY

Embodiments of the invention concern a HDD carrier design for reducing airflow-inducted vibrations and a computing device including such HDD carriers.

In a first embodiment of the invention, a computing device is provided that includes an enclosure with a first end and a second end, an airflow system for providing airflow from the first end to the second end, one or more HDD carriers, and a drive bay disposed in the enclosure and configured for removably receiving one or more hard drive disk carriers.

In the first embodiment, each of the HDD carriers includes a bracket assembly configured for removably securing a HDD in the drive bay so that a first end of the hard disk drive faces the first end of the enclosure and a second end of the HDD faces the second end of the enclosure. The bracket assembly is also configured for substantially exposing major surfaces of the HDD to yield exposed surfaces and comprising at least one end member associated with the second end of the HDD. The HDD carriers also include an airfoil assembly having one or more louvers configured to extend from at least the second end of the HDD and partially cover at least one of the exposed surfaces.

In the computing device, each of the one or more louvers can define a continuous surface extending substantially between the at least one of the exposed surfaces and the at least one end member. Alternatively, each of the one or more louvers can define a discontinuous surface extending substantially between the at least one of the exposed surfaces and the at least one end member. (how to define louvers continuous and discontinuous)

In some configurations, the airfoil assembly is configured to wrap around the second end of the HDD. Further, the one or more louvers can include at least one first louver associated with a first of the major surfaces and at least one second louver associated with a second of the major surfaces.

In some configurations, the airfoil assembly is attached to the bracket assembly.

In a second embodiment of the invention, there is provided a HDD carrier for reducing airflow-induced vibration of a HDD disposed within an enclosure with airflow from a first end of the enclosure to a second end of the enclosure. The HDD carrier includes a bracket assembly configured to removably secure the HDD to a receiving component within the enclosure, the bracket assembly configured for substantially exposing major surfaces of the hard drive to yield exposed surfaces and for mounting within the enclosure so that a first end of the hard disk drive faces the first end of the enclosure and a second end of the hard disk drive faces the second end of the enclosure, the bracket assembly comprising at least one end member associated with the second end of the hard disk drive. The HDD carrier also includes an airfoil assembly having one or more louvers configured to extend from at least the second end of the hard disk drive and partially cover at least one of the exposed surfaces.

In the computing device, each of the one or more louvers can define a continuous surface extending substantially between the at least one of the exposed surfaces and the at least one end member. Alternatively, each of the one or more louvers can define a discontinuous surface extending substantially between the at least one of the exposed surfaces and the at least one end member.

In some configurations, the airfoil assembly is configured to wrap around the second end of the HDD. Further, the one or more louvers can include at least one first louver associated with a first of the major surfaces and at least one second louver associated with a second of the major surfaces.

In some configurations, the airfoil assembly is attached to the bracket assembly.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As discussed above, excessive vibration can be detrimental to the operation of a HDD. Excessive vibration may lead to decreased HDD performance such as recoverable and non-recoverable write inhibits, increased seek times, and increased read and write access times. Excessive vibration may also cause premature HDD failures that are not repairable. Examples include mechanically-damaged platters and read/write heads, mechanical wear on moving HDD components, and data error defects that cannot be corrected through the use of software tools.

In general, efforts to reduce excessive vibration of HDD have focused on device-induced vibrations. That is, the vibrations directly caused by the operation of the mechanical components, including mechanical vibrations cause by the HDDs themselves or fan. However, other causes of excessive vibration have not been generally studied or addressed. In particular, airflow-induced vibrations.

As will be described in greater detail below, airflow-induced vibrations are typically the result of turbulent airflow within the proximity of the HDD. This turbulent airflow can apply mechanical forces against the HDD and cause vibration of the HDD. In previous HDD technology generations, such airflow-induced vibrations were of little concern, but as HDD storage density has been increased, their sensitivity to vibration-induced errors has also increased. As a result, airflow-induced vibrations have been garnering more attention.

Prior to discussing the various embodiments in more detail, it is useful to understand the causes of airflow-induced vibrations in greater detail. Accordingly, the disclosure first turns to FIGS. 1 and 2.

Figure 1:
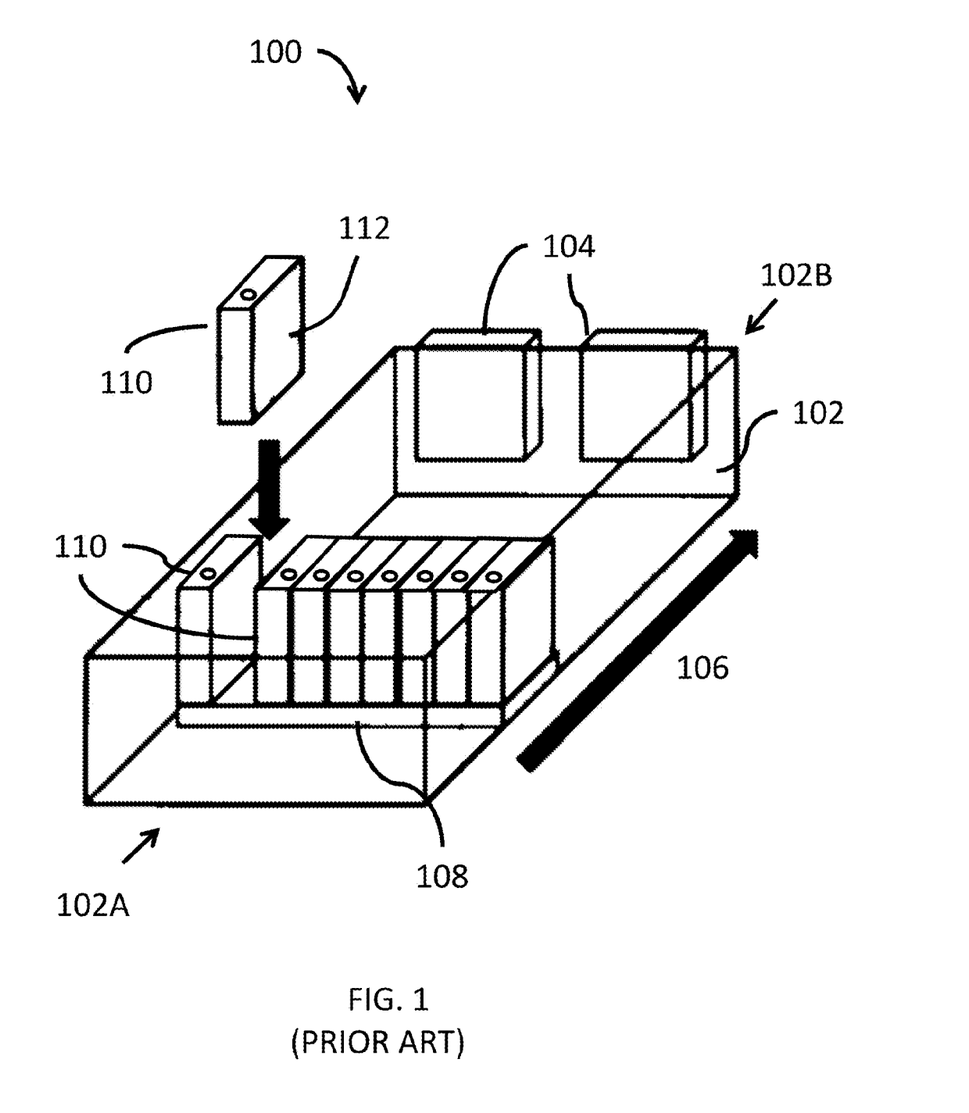
FIG. 1 is a schematic of a computing device that is useful for describing the various embodiments of the invention.

FIG. 1 is a schematic of a computing device 100 that is useful for describing the various embodiments of the invention. Such a computing device can be a standalone computer or server or a server or other device configured for installation in a rack. For example, computing device can be a rack server system, a blade server, or the like. However, the various embodiments are not limited in this regard.

As shown in FIG. 1, the computing device 100 includes a chassis or enclosure 102 with a first end 102A and a second end 102B. Although not illustrated, the enclosure 102 can include a lid or other features for accessing components disposed therein.

The enclosure 102 also includes air cooling components 104 that are configured to establish an airflow 106 through enclosure 102. For example, as shown in FIG. 1, the air cooling components 104 include fans disposed at a second end 102B of enclosure 102 and are configured to direct air to establish an airflow from the first end 102A to the second end 102B of the enclosure 102.

Although only two air cooling components 104 at the second end 102B of enclosure 102 are illustrated in FIG. 1, this is solely for ease of illustration. In the various embodiments, any number of air cooling components 104 can be provided in enclosure 102. Additionally, the sizes and types of such air cooling components 104 can also vary, including using different combinations of different sizes and types of air cooling components 104. Further, the locations of the air cooling components 104 can vary. That is, in some configurations, the air cooling components can be disposed at the first end 102A of the enclosure 102, the second end 102B of the enclosure 102, within the enclosure 102, or any combination of locations. Finally, although air cooling components 104 are illustrated as fans in FIG. 1, the present disclosure contemplates that any other type of components capable of establishing airflow 106 can be used in the various embodiments.

As shown in FIG. 1, the enclosure 100 also includes a drive bay 108. The drive bay 108 can include one or more receiving components for receiving and securing a HDD carrier 110 for a HDD 112 within enclosure 102. The HDD carrier 110 will be discussed below in greater detail with respect to FIG. 2. As shown in FIG. 1, the drive bay 108 and its receiving components can be arranged so that the HDDs 112 are disposed in enclosure to form a row of HDDs. Further, the HDDs 112 are arranged so that air flows between and around each of the HDDs.

Figure 2:
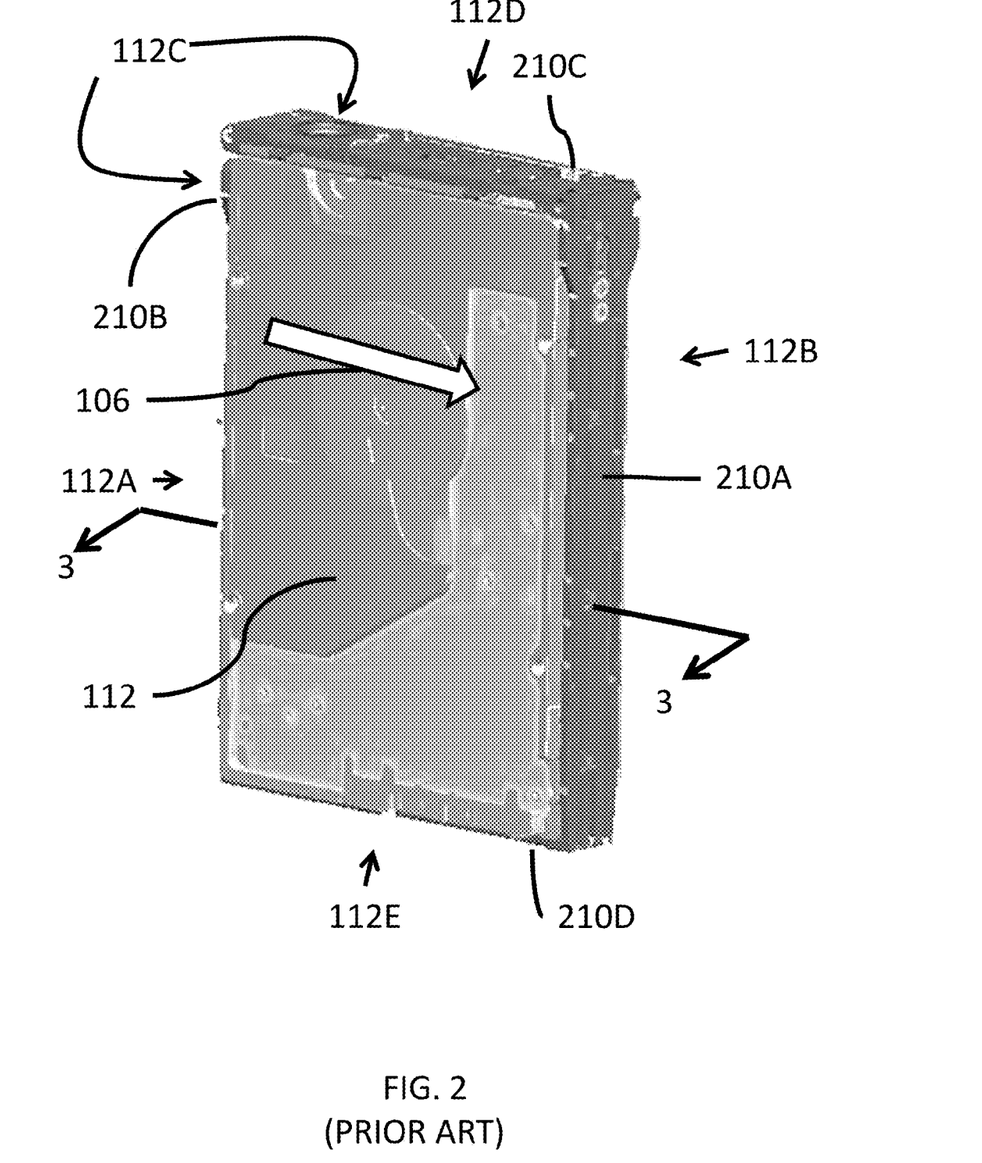
FIG. 2 is a schematic of a HDD carrier with a HDD installed therein that is useful for describing the various embodiments of the invention.

FIG. 2 is a schematic of the HDD carrier 110 with the HDD 112. As shown in FIG. 2, the HDD carrier 110 consists of a bracket assembly defined by members 210A, 210B, 210C, and 210D. In particular, the bracket assembly is configured to surround the a first end 112A of the HDD 112, a second end 112B of the HDD 112, a first side portion 112C of the HDD 112, and a second side portion 112D of the HDD 112, while leaving the major surfaces 112C of the HDD 112 substantially exposed. The members 210A-210D can be configured to engage with the receiving components of the drive bay 108 to secure the HDD carrier 110 and HDD 112 within enclosure 102. Such a bracket assembly design can be utilized to minimize the amount of hardware required for securing HDD 112 in enclosure 102, as well as minimize the space required for supporting HDD 112 in enclosure 102.

However, while the design of the HDD carrier 110 minimizes the amount of hardware and the amount of space required for supporting HDD 112 within enclosure 102, this design also increases the amount of airflow-induced vibration for HDD 112. This is illustrated below with respect to FIG. 3.

Figure 3:
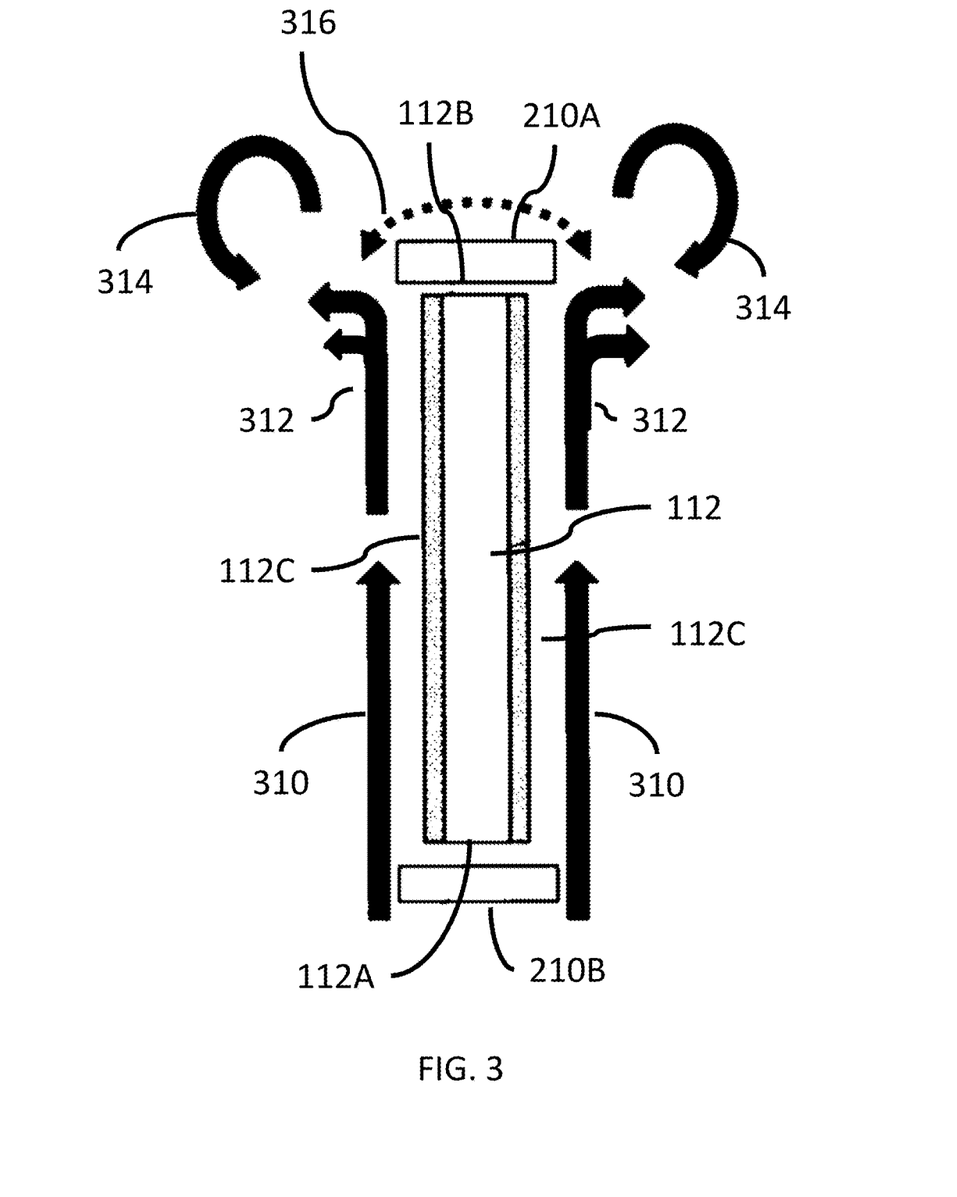
FIG. 3 is a schematic through cutline 3-3 that illustrates airflow-induced vibration in a HDD.

FIG. 3 is a schematic of the HDD carrier of FIG. 2 through cutline 3-3 that illustrates airflow-induced vibration in a HDD. When HDD carrier 110 and HDD 112 are secured within enclosure 102 and airflow 106 is established, the geometry of the various surfaces can result in turbulent airflow that can induce vibrations of HDD 112.

In operation, when airflow 106 is established, such airflow is not smooth or laminar for various reasons. First, the major surfaces 112C of HDD 112 may not be completely smooth. For example, as illustrated in FIG. 2, circuitry portions of HDD 112 may be exposed. In another example, the members 210A-210D of the bracket assembly may not exactly match up with adjacent surfaces of HDD 112. As a result, the discontinuities between the bracket assembly and the HDD 112 can result in at least small disruptions in airflow. The net effect is schematically illustrated in FIG. 3.

Initially, airflow 310 near the first end 112A of the HDD 112 may be substantially undisrupted and thus may not introduce any type of vibrations. However, as the air continues to flow over the major surfaces 112C, any discontinuities in these surfaces will introduce disruptions in the airflow, leading to potential vibrations being transferred to the HDD 112. Near the second end 112B of the HDD 112, the discontinuities between the HDD 112 and the member 210A can cause disrupted airflow 312 at or near the second end 112B of HDD 112. This disrupted airflow 312 can result in vortices 314 and other types of airflow disturbances that can vary air pressures in the vicinity of the second end 112B of the HDD 112. These variations in air pressure can result in uneven pressures applied against major surface 112C near the second end 112B of the HDD 112 and thus result in vibrations being induced, including vibrations that can affect the operation of the HDD 112.

In view of these airflow-induced vibrations, the present disclosure contemplates an improved HDD carrier design that incorporates an airfoil assembly to reduce the amount of disrupted airflow and thus reduce the amount of airflow-induced vibrations. This is illustrated below with respect to FIGS. 4A and 4B.

Figure 4A:
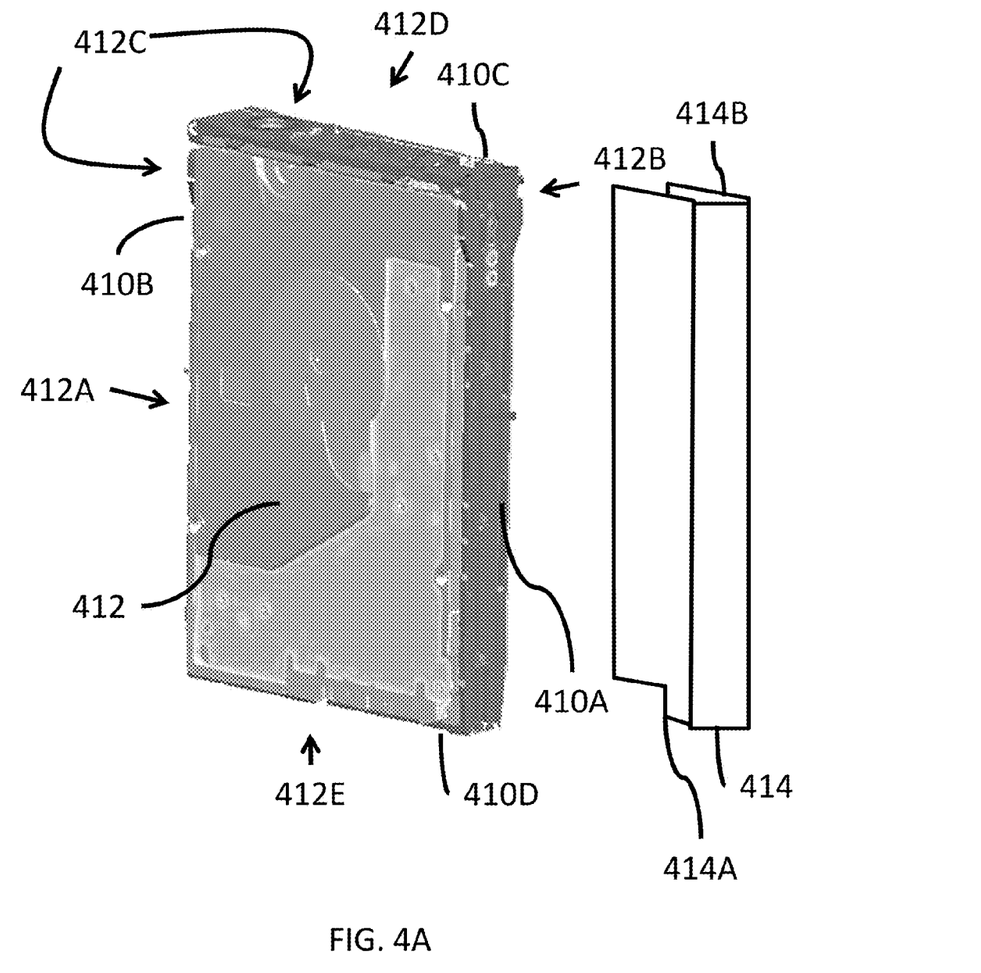
FIGS. 4A and 4B are schematics, in partially exploded and non-exploded views, illustrating a HDD carrier with a HDD installed therein that is configured for reduced airflow-induced vibration in accordance with an embodiment of the invention.
Figure 4B:
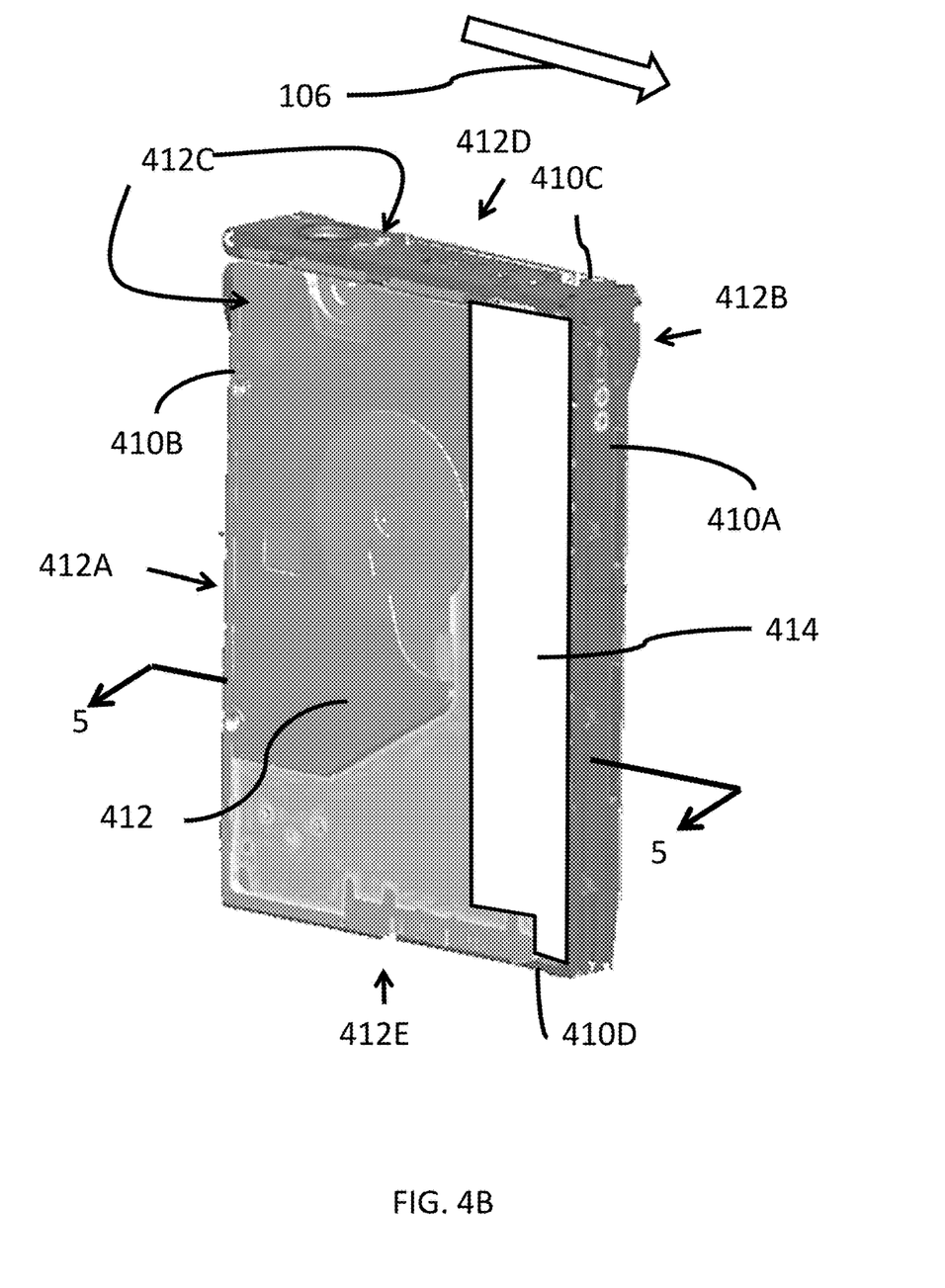

FIGS. 4A and 4B schematic illustrate, in partially exploded and non-exploded views, a HDD carrier 410 with a HDD 412 installed therein that is configured for reduced airflow-induced vibration in accordance with an embodiment of the invention. As shown in FIGS. 4A and 4B, the configuration of HDD carrier 410 with HDD 412 installed therein is similar to that shown in FIG. 2. Accordingly, the description of the components associated with reference numerals 112A-112D and 210A-210D is sufficient for describing components associated with reference numerals 412A-412D and 410A-410D, respectively.

In addition to the foregoing, the HDD carrier 410 also includes an airfoil assembly 414. The airfoil assembly 414 includes one or more louvers 414A, 414B that extend over a portion of the major surfaces 412C of the HDD 412 to the second end 412B of HDD 412. In operation, the louvers 414A, 414B directing and smooth out airflow over a portion of the major surface 412C of HDD 412 at or near the second end 412B of HDD 412 to minimize airflow disruptions and thus reduce airflow-induced vibrations. This is illustrated below with respect to FIG. 5.

Figure 5:
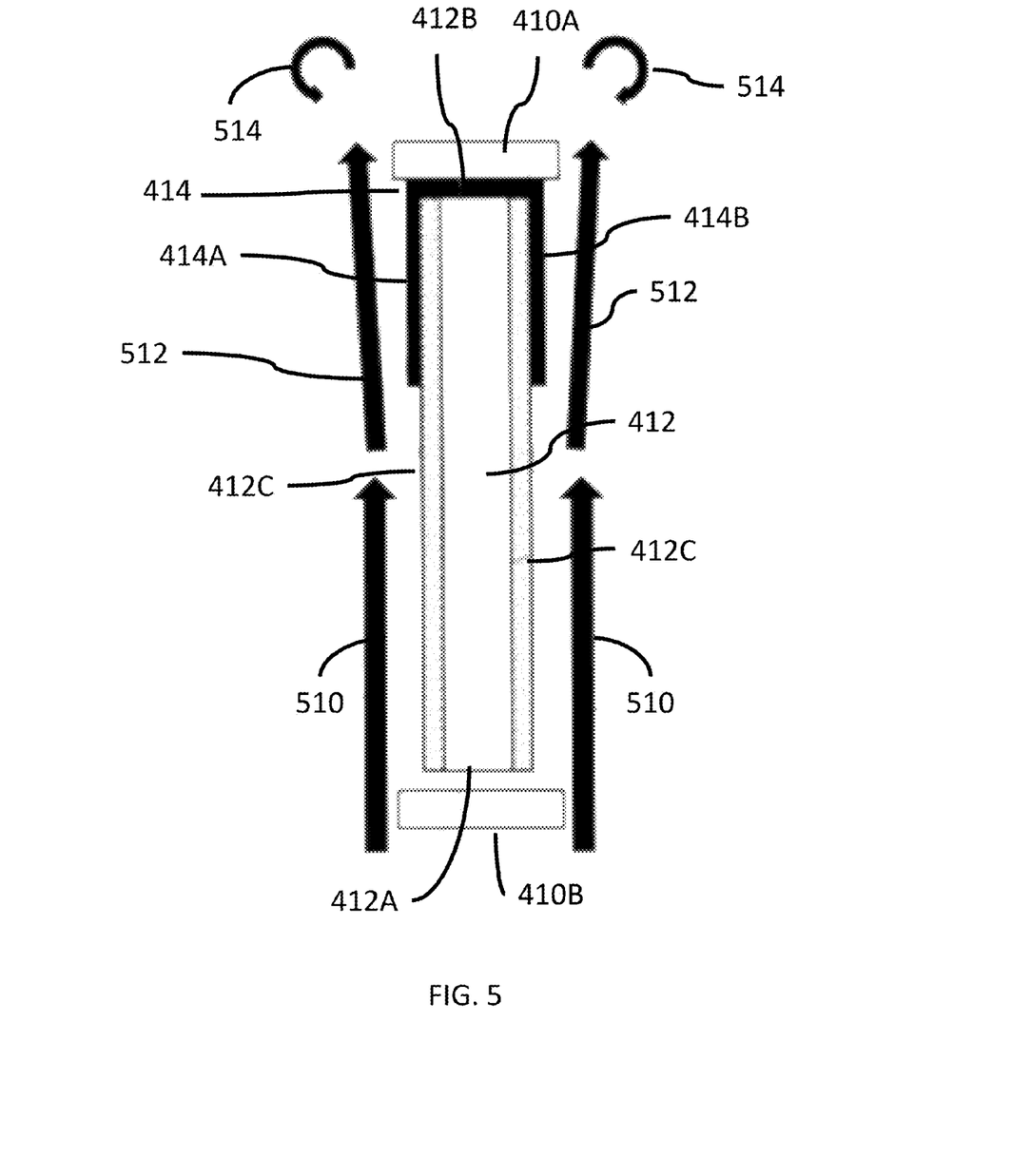
FIG. 5 is a schematic of the HDD carrier of FIG. 4 through cutline 5-5 that illustrates the reduced airflow-induced vibration for the HDD carrier of FIG. 4.

FIG. 5 is a schematic of the HDD carrier of FIGS. 4A and 4B through cutline 5-5 that illustrates the reduced airflow-induced vibration for the HDD carrier of FIGS. 4A and 4B.

As discussed above with respect to FIG. 3, initially, airflow 510 near the first end 412A of the HDD 412 may be substantially undisrupted and thus may not introduce any type of vibrations. Near the second end 412B of the HDD 412, the discontinuities between the HDD 412 and the member 410A would normally cause disrupted airflow at or near the second end 412B of HDD 412. However, the airfoil assembly 414 minimizes these disruptions in airflow.

In particular, the airflow assembly 414 is configured to provide a progressive, if not smooth, transition between the major surfaces 412C and the end member 410A, as indicated by the dotted line in FIG. 5. In doing so, the amount of disruption in airflow can be significantly reduced or even eliminated. Thus, the airflow 512 near the second end 412B of the HDD 412 has significantly less disruptions. As a result, any vortices 514 or other types of airflow disturbances that can vary air pressures in the vicinity of the second end 412B of the HDD 412 are of a significantly lower magnitude. Therefore, any variations in air pressure do not generally result in any significantly uneven pressures applied against major surface 412C near the second end 412B of the HDD 412 and thus result in vibrations being induced and the amount of vibrations generated that can affect the operation of the HDD 412 is significantly reduced or even eliminated.

In the various embodiments, the design of the airfoil assembly can vary. For example, as shown in FIG. 4A, the airfoil assembly can be configured as an insert between the bracket assembly and the HDD that wraps around an end of the HDD. As such the bracket assembly holds the airfoil assembly in place. Alternatively, the airfoil assembly can be incorporated into the bracket assembly. That is, the airfoil assembly can be attached to the bracket assembly in some configurations. In other configurations. The louvers can extend from the bracket assembly.

To reduce airflow between the louvers and the HDD, it is desirable for the fit between the louvers and the major surfaces of the HDD to be as tight as possible. Accordingly, the louvers of the airfoil assembly can be biased inward. In such configurations, at least the louvers can be constructed from a flexible material. Alternatively or in addition, the edge of the louvers contacting the major surface of the HDD can be a softer material to ensure a seal when the louvers are biased inward.

Figure 6A:
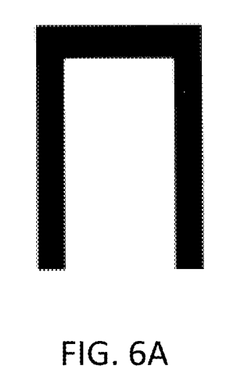
FIGS. 6A, 6B, 6C, and 6D illustrate various potential configurations for an airfoil in accordance with the various embodiments.

In addition to the foregoing, the geometry of the airfoil assembly can vary. FIGS. 6A, 6B, 6C, and 6D illustrate various potential configurations for the airfoil assembly in accordance with the various embodiments. FIG. 6A shows a "square" configuration. That this, the edges of the louvers are squared off. In such configurations, the thickness of the louvers can be selected so that the edges are relatively small and provide only minor disruption of airflow.

Figure 6B:
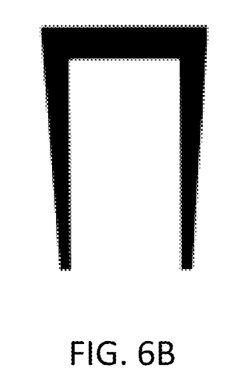
Figure 6C:
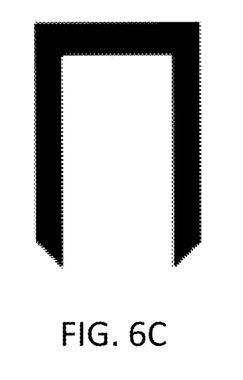

In some configurations, the louvers can be tapered along their entire length to enhance airflow. This is illustrated in FIG. 6B. Alternatively, as shown in FIG. 6C, the taper can be applied to only a portion of the length of the louvers.

Figure 6D:
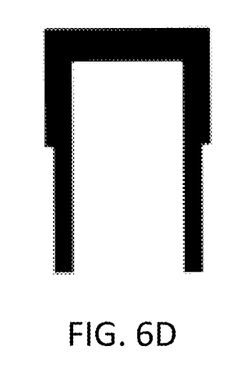

In the configurations above, the surface of the louvers along its length is substantially continuous. However, in other configurations, the surface of the louvers can be discontinuous, as illustrated in FIG. 6D. As shown in FIG. 6D, the louvers can have a step-wise configuration. The steps can be selected to provide a progressive slope to enhance airflow. Further, although only one step is shown in FIG. 6D, any number of steps can be used.

In the various embodiments, the design of the airfoil assembly can vary. The airfoil assembly can be significantly reduced or even eliminated by airflow-induce vibration. There are two configurations for explanations, one is without airfoil assembly and another is with airfoil assembly, the HDD increased substantially in performance when the HDD with airfoil assembly that can improved HDD performance from 52.2% to 89.5%. Thus, the airfoil assembly is very useful for reduced or even eliminated by airflow-induced vibration.

|  | HDD performance |
|---|---|
| Without airfoil assembly | 52.20% |
| With airfoil assembly | 89.50% |

The examples shown here are not intended to limit the various embodiments. Rather they are presented solely for illustrative purposes.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computing device, comprising:
    an enclosure with a first end and a second end;
    an airflow system for providing airflow from the first end to the second end;
    one or more hard drive disk carriers; and
    a drive bay disposed in the enclosure and configured for removably receiving the one or more hard drive disk carriers,
    wherein each of the hard drive disk carriers comprises:
        a bracket assembly configured for removably securing a hard disk drive in the drive bay so that a first end of the hard disk drive faces the first end of the enclosure and a second end of the hard disk drive faces the second end of the enclosure, the bracket assembly configured for substantially exposing major surfaces of the hard drive to yield exposed surfaces and comprising at least one end member associated with the second end of the hard disk drive; and
        an airfoil assembly, the airfoil assembly comprising one or more louvers configured to extend from at least the second end of the hard disk drive and partially cover at least one of the exposed surfaces, wherein the airfoil assembly is configured to wrap around the second end of the hard disk drive, and a cross-section of the one or more louvers is substantially U-shaped.

2. The computing device of claim 1, wherein each of the one or more louvers define a continuous surface extending substantially between the at least one of the exposed surfaces and the at least one end member.

3. The computing device of claim 1, wherein each of the one or more louvers is configured to define a discontinuous surface extending substantially between the at least one of the exposed surfaces and the at least one end member.

4. The computing device of claim 1, wherein the one or more louvers comprise at least one first louver associated with a first of the major surfaces and at least one second louver associated with a second of the major surfaces.

5. The computing device of claim 1, wherein the airfoil assembly is attached to the bracket assembly.

6. A hard drive disk carrier for reducing airflow-induced vibration of a hard disk drive disposed within an enclosure with an airflow from a first end of the enclosure to a second end of the enclosure, comprising:
    a bracket assembly configured to removably secure the hard disk drive to a receiving component within the enclosure, the bracket assembly configured for substantially exposing major surfaces of the hard drive to yield exposed surfaces and for mounting within the enclosure so that a first end of the hard disk drive faces the first end of the enclosure and a second end of the hard disk drive faces the second end of the enclosure, the bracket assembly comprising at least one end member associated with the second end of the hard disk drive; and
    an airfoil assembly, the airfoil assembly comprising one or more louvers configured to extend from at least the second end of the hard disk drive and partially cover at least one of the exposed surfaces, wherein the airfoil assembly is configured to wrap around the second end of the hard disk drive, and a cross-section of the one or more louvers is substantially U-shaped.

7. The hard disk carrier of claim 6, wherein each of the one or more louvers are configured to define a continuous surface extending substantially between the at least one of the exposed surfaces and the at least one end member.

8. The hard disk carrier of claim 6, wherein each of the one or more louvers is configured to define a discontinuous surface extending substantially between the at least one of the exposed surfaces and the at least one end member.

9. The computing device of claim 6, wherein the one or more louvers comprise at least one first louver associated with a first of the major surfaces and at least one second louver associated with a second of the major surfaces.

10. The hard disk carrier of claim 6, wherein the airfoil assembly is attached to the bracket assembly.

* * * * *